United States Patent Office 2,929,905
Patented Mar. 22, 1960

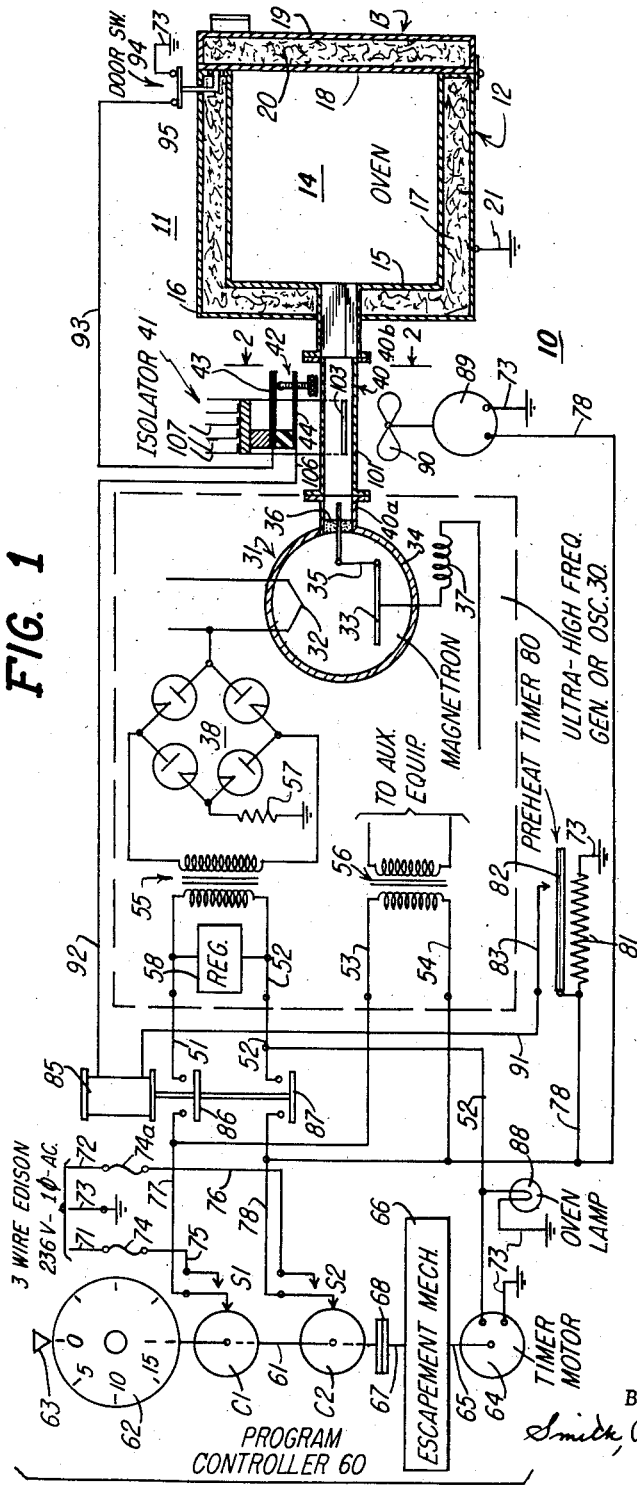

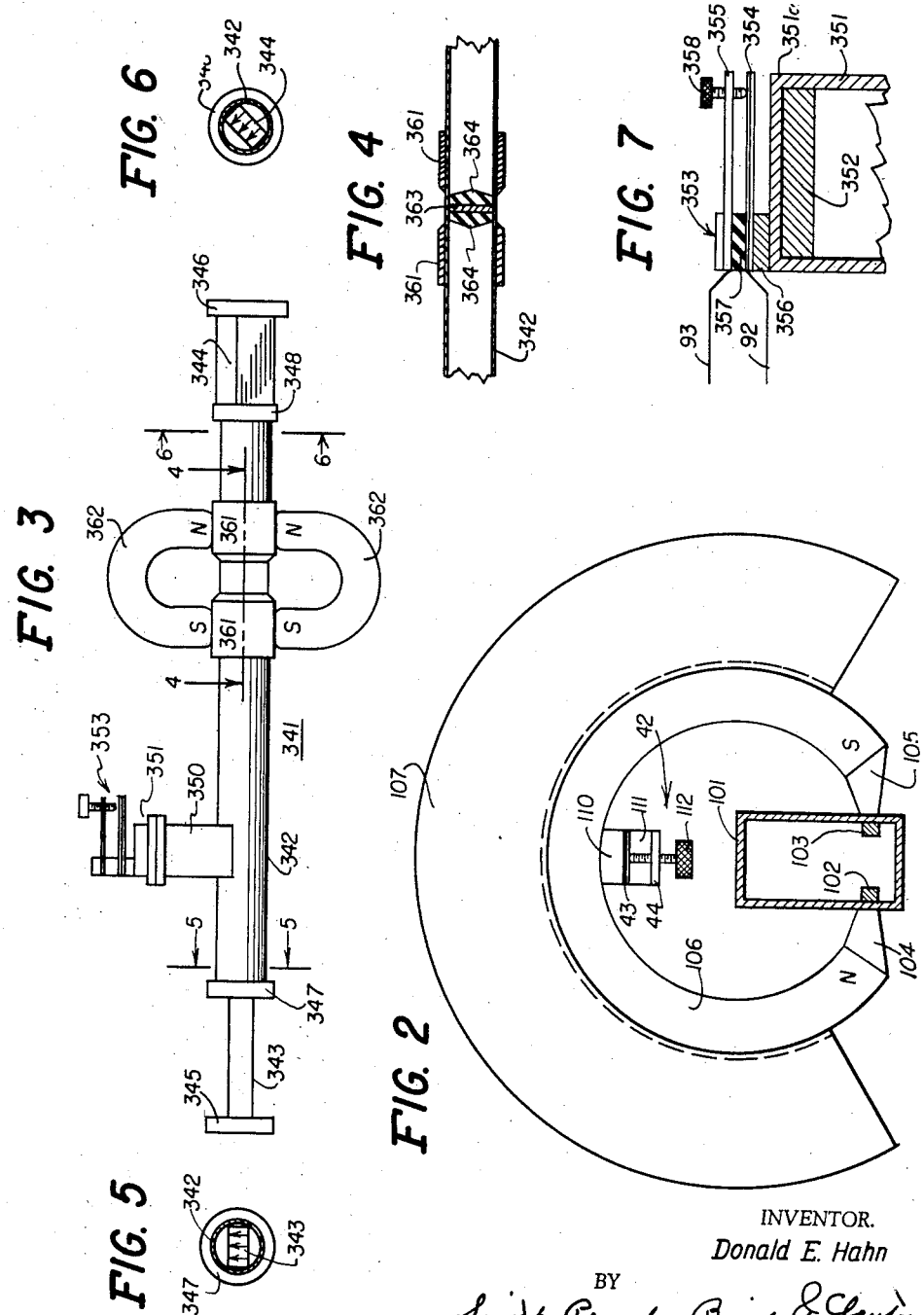

2,929,905
ELECTRONIC COOKING APPARATUS
Donald E. Hahn, Chicago, Ill., assignor to General Electric Company, a corporation of New York
Application May 28, 1958, Serial No. 738,558
6 Claims. (Cl. 219—10.55)

The present invention relates to electronic cooking apparatus, and more particularly to such apparatus provided with an improved arrangement for protecting the microwave generator incorporated therein during no-load and light-load operating conditions of the apparatus.

Electronic cooking apparatus conventionally comprises metal wall structure defining a substantially closed cooking cavity, a microwave generator (ordinarily a magnetron oscillator circuit), and a wave guide interconnecting the cooking cavity and the generator; whereby under no-load and light-load operating conditions in the cooking cavity, substantial microwave energy is reflected from the cooking cavity back through the wave guide to the magnetron causing the magnetron to load upon its own seal, with the resulting heating thereof and the attendant damage thereto.

It has been proposed heretofore that in electronic cooking apparatus of the character described, limited protection of the magnetron may be provided by incorporating a termination circuit in the wave guide that imposes at least a minimum dissipative load upon the magnetron at all times, so as to minimize loading of the magnetron upon its own seal during no-load and light-load operating conditions in the cooking cavity. In this arrangement, the termination circuit consists of a body of powdered iron or other "lossy" material disposed in the wave guide and operative to absorb a certain proportion of the microwave energy penetrating the same.

While the arrangement described affords some measure of protection to the magnetron, it is subject to the criticism that it also effects the dissipation of the direct microwave energy from the magnetron to the cooking cavity under all operating conditions in the cooking cavity, thereby reducing the operating efficiency of the apparatus under load operating conditions in the cooking cavity.

Accordingly, it is a general object of the present invention to provide in an electronic cooking apparatus of the character described, an improved arrangement for protecting the magnetron incorporated therein, which arrangement does not materially impair the operating efficiency of the apparatus under load operating conditions in the cooking cavity.

Another object of the invention is to provide in electronic cooking apparatus of the character described, an improved isolator arrangement disposed in the wave guide between the magnetron and the cooking cavity that is highly selective to the direction of the microwave energy in the wave guide, so that only reflected microwave energy from the cooking cavity back through the wave guide toward the magnetron is substantially absorbed by the isolator, thereby to protect the magnetron, without impairing the operating efficiency of the apparatus under load operating conditions in the cooking cavity.

A further object of the invention is to provide in cooking apparatus of the character described, an improved circuit control arrangement for the magnetron, that is effective to protect the magnetron against damage under no-load and light-load operating conditions in the cooking cavity.

A still further object of the invention is to provide in electronic cooking apparatus of the character described, an improved control circuit for the magnetron that is of improved and simplified connection and arrangement.

Further features of the invention pertain to the particular arrangement of the elements of the electronic cooking apparatus and of the control circuit therefor; whereby the above-outlined and additional operating features thereof are attained.

The invention, both as to its organization and method of operation, together with further objects and advantages thereof, will best be understood by reference to the following specification, taken in connection with the accompanying drawings, in which:

Figure 1 is a diagrammatic illustration of electronic cooking apparatus incorporating a wave guide interconnecting a microwave generator and an oven cavity and provided with an isolator, and embodying the present invention;

Fig. 2 is a greatly enlarged lateral sectional view, taken through the wave guide, in the direction of the arrows, along the line 2—2 in Fig. 1, illustrating the arrangement of the isolator incorporated therein;

Fig. 3 is a plan view of a modified form of an isolator that is adapted to be incorporated in the wave guide in the cooking apparatus of Fig. 1;

Fig. 4 is a longitudinal sectional view, taken through the isolator in the direction of the arrows along the line 4—4 of Fig. 3;

Fig. 5 is a lateral sectional view, taken through the isolator, in the direction of the arrows along the line 5—5 in Fig. 3;

Fig. 6 is another lateral sectional view, taken through the isolator in the direction of the arrows along the line 6—6 of Fig. 3; and Fig. 7 is a greatly enlarged fragmentary sectional view taken through the top of the cap provided on the outer end of the side arm incorporated in the isolator of Fig. 3.

Referring now to Fig. 1 of the drawings, the electronic cooking apparatus 10 there illustrated, and embodying the features of the present invention, comprises a range 11 of any suitable construction. As illustrated, the range 11 comprises a metallic enclosure, including a housing section 12 provided with an open front and a front door section 13, and defining a substantially closed oven cavity or chamber 14, the front door section 13 being mounted adjacent to the lower edge thereof upon the housing section 12 for movements between a substantially vertical closed position and a substantially horizontal open position. The housing section 12 comprises a metal inner liner 15 and a metal outer shell 16 arranged generally in spaced-apart relation with thermal insulation 17 therebetween, if desired; and similarly, the door section 13 comprises a metal inner liner 18 and a metal outer shell 19 arranged generally in spaced-apart relation with thermal insulation 20 therebetween, if desired. Microwave energy is supplied to the oven cavity 14 from a microwave generator or oscillator 30, including a magnetron 31, via an interconnecting wave guide 40 including an intermediate isolator 41.

The magnetron 31 comprises a filamentary cathode 32, a plate 33 and a metal envelope 34 having an opening therethrough in which there is disposed a coupler 35 mounted in an associated closing seal 36, the coupler 35 being connected to the plate 33 and coupled to the adjacent end of the wave guide 40. The other end of the wave guide 40 is electrically connected to the shell 16 and to the liner 15; which elements are further grounded as indicated at 21. For example, the magnetron may be capable of oscillating at the ultra-high frequency of 2450 megacycles; whereby the microwave energy is radiated by the coupler 35 through the wave guide 40 and thence into the oven cavity 14. Also, the oscillator 30 is provided with a magnet coil 37 arranged in an exciting circuit for the purpose of isolating from the auxiliary equipment the microwave energy supplied by the magnetron 31, to the oven cavity 14, as well as a rectifier bridge 38. Further, the oscillator 30 comprises a pair of primary power supply conductors 51—52 and a pair of secondary power supply conductors 53—54. The primary power supply conductors 51—52 are connected to the primary winding of a coupling transformer 55, the secondary winding of which is connected to the input terminals of the rectifier bridge 38; and the secondary power supply conductors 53—54 are connected to the primary winding of a coupling transformer 56, the secondary winding of which is connected directly to auxiliary equipment, not shown, supplying the various filamentary cathodes 32, etc. The output terminals of the rectifier bridge 38 are connected between the filamentary cathode 32 of the magnetron 31 and the ground potential via a resistor 57 so that about −5,000 volts D.-C. is applied to the filamentary cathode 32; and a regulator 58 of any suitable type is connected between the primary power supply conductors 51—52 for the purpose of maintaining a substantially constant voltage across the primary winding of the coupling transformer 55.

Also, the circuit comprises a program controller 60 including a rotatably mounted operating shaft 61 carrying two insulating control cams C1 and C2 that are respectively operatively associated with two sets of switch springs S1 and S2. The outer end of the operating shaft 61 carries a manually operable dial 62 that is provided with time indicia cooperating with an associated index marker 63; and further, a timer motor 64 of the synchronous type is provided that has an operating shaft 65. The operating shaft 65 is connected to escapement mechanism 66 that is provided with an operating shaft 67. The inner end of the operating shaft 61 and the outer end of the operating shaft 67 are interconnected by a slip clutch 68.

In the arrangement, when the manual dial 62 is operated out of its "0" or "off" position into its time-setting position, the control cams C1 and C2 close the sets of switch springs S1 and S2, and the timer motor 64 is operated to govern the escapement mechanism 66 so that the operating shaft 67 is rotated one step each minute; which step-by-step rotation is imparted to the operating shaft 61 through the friction clutch 68, so that the manual dial 62 is returned back into its off position, with the result that the control cams C1 and C2 open the sets of switch springs S1 and S2 in order to terminate the operation of the timer motor 64 and the consequent step-by-step rotation of the operating shaft 61. In the arrangement, the slip clutch 68 accommodates rotation of the operating shaft 61 under the control of the manual dial 62 independently of the operating shaft 67 in the initial setting of the manual dial 62, as explained above.

Further, the circuit comprises a source of power supply of the 3-wire Edison type of 236 volts, single-phase, A.-C., including two outside conductors 71 and 72 and a grounded neutral conductor 73. The outside conductors 71 and 72 are connected by respective fuses 74 and 74a to two conductors 75 and 76. The switch springs of the set S1 respectively terminate the conductor 75 and a conductor 77; while the switch springs of the set S2 respectively terminate the conductor 76 and a conductor 78. Also, the circuit comprises a preheat timer 80 that includes an electric heating element 81 and an associated bimetallic element 82 and a cooperating switch spring 83, as well as a relay 85 that governs a pair of contact bridging members 86 and 87. Finally, the circuit comprises an oven lamp 88 and a fan motor 89, the fan motor 89 operating a fan 90 that is operatively associated with the isolator 41 for a purpose more fully explained hereinafter.

In the circuit, the contacts operatively associated with the contact bridging member 86 respectively terminate the conductors 77 and 51, and the contacts operatively associated with the contact bridging member 87 respectively terminate the conductors 78 and 52. In the preheat timer 80, the electric heating element 81 is bridged between the conductor 78 and the grounded neutral line 73, the bimetallic element 82 is connected to the conductor 78 and the switch spring 83 is connected to a conductor 91. The oven lamp 88 is bridged between the conductor 52 and the grounded neutral line 73; the winding of the timer motor 64 is bridged between the conductor 52 and the grounded neutral line 73; the winding of the fan motor 89 is bridged between the conductor 78 and the grounded neutral line 73; and the winding of the relay 85 is bridged across the conductor 91 and a conductor 92.

The isolator 41 comprises a thermostat 42 that includes a bimetallic element 43 connected to a conductor 93 and a switch spring 44 connected to the conductor 92; while the range 10 is provided with a door switch 94 that includes a contact bridging member 95 provided with a pair of contacts respectively terminating the conductor 93 and the grounded neutral line 73. In the arrangement, the door switch 94 is operated between its open and closed positions when the front door section 13 is respectively operated between its open and closed positions.

Considering now the general mode of operation of the control circuit in conjunction with the range 11, the cook places the food in the oven compartment 14 and closes the front door section 13; whereby the door switch 94 occupies its closed position; and at this time, it may be assumed that the isolator 41 is cool so that the thermostatic switch 42 occupies its closed position. The cook then operates the manual dial 62 out of its "off" position setting a time interval during which the electronic cooking operation in the oven cavity 14 is to take place. When the manual dial 62 is thus set out of its "off" position, the control cams C1 and C2 close the sets of switch springs S1 and S2 connecting power to the conductors 77 and 78 and consequently to the secondary power supply conductors 53 and 54 in order to initiate operation of the auxiliary equipment, not shown, incorporated in the oscillator 30. Also, the connection of power to the conductor 78 completes a circuit for energizing the heating element 81 of the preheat timer 80 so that after the expiration of about 75 seconds, the bimetallic element 82 is deflected to engage the switch spring 83 in order to complete a circuit including the thermostatic switch 42 and the door switch 94 for energizing the winding of the relay 85 so as to effect operation thereof. Upon operating the relay 85 closes the contact bridging members 86 and 87 so as to connect power to the primary power supply conductors 51 and 52, with the result that the oscillator 30 is operated; whereby the magnetron 31 supplies microwave energy via the wave guide 40 to the oven cavity 14 effecting electronic cooking of the food arranged therein.

Also, the connection of power to the conductor 78 effects operation of the fan motor 89 so that the fan 90 circulates a current of air over the isolator 41 to effect cooling thereof, for a purpose more fully explained hereinafter. Further, the connection of power to the conductor 52 effects illumination of the oven lamp 88 indicating that the cooking operation is in progress. Further, the connection of power to the conductor 52 effects operation of the timer motor 64 with the result that the program controller 60 is operated step-by-step in the manner previously explained, so that upon the expiration of the preset time interval, the manual dial 62 is returned back into its "off" position.

When the manual dial 62 is thus returned back into its "off" position, the sets of switch springs S1 and S2 are opened, thereby to bring about the interruption of power to the primary power supply conductors 51—52 so as to terminate the operation of the magnetron 31, and to bring about the interruption of power to the secondary power supply conductors 53—54 so as to terminate the operation of the auxiliary equipment, not shown; whereby at this time operation of the oscillator 30 is terminated. Of course, the removal of power from the conductor 78 terminates the heating of the heating element 81 of the preheat timer 80, with the result that the bimetallic element 82 cools and the door switch 94 is operated into its open position, thereby to interrupt the previously traced circuit for retaining operated the relay 85, causing the latter relay to restore to interrupt at the contact bridging members 86 and 87 the primary supply power connections to the oscillator 30, whereby operation of the magnetron 31 is arrested to terminate the supply of microwave energy to the oven cavity 14. Upon restoring, the relay 85 interrupts at the contact bridging member 87 the power connection to the conductor 52 so as to arrest further operation of the timer motor 64. Subsequently, when the front door section 13 is returned by the cook back into its closed position, the door switch 94 is reclosed so as to effect reoperation of the relay 85, whereby further operation of the oscillator 30 is again initiated and further operation of the timer motor 64 is continued.

As previously noted, the above traced circuit for operating the relay 85 also includes the thermostatic switch 42 that is carried by the isolator 41, and at this point, it is noted that the thermostatic switch 42 normally occupies its closed position, but in the event of operation thereof into its open position, the above traced circuit for retaining operated the relay 85 is interrupted. Accordingly, the control of the relay 85 by the thermostatic switch 42 is similar to that which is exercised by the door switch 94, since the two switches 42 and 94 are arranged in series relation in the operating circuit for the winding of the relay 85. At this point, it is only necessary to mention that in the event of undue heating of the isolator 41, that may occur under certain operating conditions explained more fully hereinafter, the thermostatic switch 42 is operated into its open position. On the other hand, upon subsequent cooling of the isolator 41, the thermostatic switch 42 is returned back into its closed position.

Referring now to Figs. 1 and 2, the isolator 41 is of the fundamental construction of that disclosed in U.S. Patent No. 2,776,412 that was granted January 1, 1957, to Arthur J. Sparling. More particularly, the isolator 41 comprises the metallic tube 101 that is arranged as an intermediate section in the wave guide 40 and disposed between the inner section 40a of the wave guide 40 that extends to the magnetron 31 and the outer section 40b of the wave guide 40 that extends to the oven cavity 14. The wave guide 40 is of metallic construction and of rectangular configuration in lateral cross-section; whereby the tube 101, or the intermediate section of the wave guide 40, also has this configuration. Also in the construction of the wave guide 40, an angular displacement, normally of about 45°, is provided between the vertical axes of the intermediate section 101 thereof and the outer section 40b thereof that is connected to the oven cavity 14, which angular displacement is employed for a purpose more fully explained hereinafter.

Two longitudinally extending and laterally spaced-apart strips or bars 102 and 103 are arranged in opposed relation with each other within the tube 101, and positioned upon the side walls thereof above the bottom wall thereof a distance about ¼ of that between the bottom wall and the top wall of the tube 101, as illustrated in Fig. 2; which bars 102 and 103 are preferably formed of a ferrite and capable of producing a phenomenon akin to the "Faraday effect." Specifically, a ferrite has the general formula $MFe_2O_4$, wherein M denotes one or two bivalent metals; and a suitable specific example is $(ZnO)(MnO)2Fe_2O_3$.

The two bars 102 and 103 are respectively suitably mounted on two pole pieces 104 and 105 that are sealed in two corresponding longitudinally extending and laterally aligned openings respectively formed in the side walls of the tube 101; and the pole pieces 104 and 105 are respectively secured to the opposite poles of a substantially cylindrical permanent magnet 106 that may be formed of "Alnico V." Accordingly, a magnetic field is set up by the permanent magnet 106 via the pole pieces 104 and 105 laterally through the bars 102 and 103 and laterally through the adjacent section of the tube 101.

The isolator 41 is operative to render the wave guide nonreciprocal with respect to its transmission characteristic in that it effects relatively low attenuation of microwave energy passing therethrough in the direction from the magnetron 31 to the oven cavity 14 and effects relatively high attenuation of microwave energy passing therethrough in the direction from the oven cavity 14 to the magnetron 31; which characteristic is produced by a phenomenon akin to the "Faraday effect" and generally results from the fact that the rotation of the field of the direct microwave energy in passing through the tube 101 is such as to match the angular displacement of the outer section 40b of the wave guide 40 connected to the oven 14, while the rotation of the field of the reflected microwave energy in passing through the tube 101 is such as totally to mismatch the angular displacement of the inner section 40a of the wave guide 40 connected to the magnetron 31.

Accordingly, when there is no-load or a light-load in the oven cavity 14, there is substantial reflected microwave energy therefrom back through the wave guide 40 toward the magnetron 31; however, the isolator 41 is effective to block the substantial return of this reflected microwave energy therethrough so as to load the magnetron 31 and to protect it, particularly the seal 36, against the reflected microwave energy mentioned. Of course, the reflected microwave energy traversing the isolator 41 is absorbed in the bars 102 and 103 with the consequent production of heat therein, so that the pole pieces 104 and 105 and the magnet 106 are correspondingly heated with the result that the thermostatic switch 42 is governed. In order to effect the dissipation of heat that is conducted into the permanent magnet 106, a plurality of longitudinally spaced-apart and substantially annular fins 107 are carried by the exterior surface of the permanent magnet 106 in good heat exchange relation therewith; which fins 107 are arranged in the current of air that is circulated by the fan 90.

Of course, the direct microwave energy in the direction from the magnetron 31 to the oven cavity 14 passes readily through the isolator 41, without substantial attenuation, whereby the isolator 41 effects no substantial reduction of the operating efficiency of the magnetron 31 under normal load operating conditions in the oven cavity 14.

Accordingly, the isolator 41 renders the wave guide 40 nonreciprocal, as previously noted, thereby to protect the magnetron 31 against reflected microwave energy from the oven cavity 14, without substantial interference or attenuation of direct microwave energy from the magnetron 31 to the oven cavity 14.

In the arrangement, the thermostatic switch 42 may be disposed above the top wall of the tube 101 and arranged within the tubular permanent magnet 106 in good heat exchange relation therewith. As illustrated, the thermostatic switch 42 comprises the bimetallic element 43 and the switch spring 44, as well as a mounting block 110 formed of heat-conducting material and arranged between the inner end of the bimetallic element 43 and the adjacent interior surface of the permanent magnet 106, and an insulating block 111 arranged between the inner ends of the bimetallic element 43 and the switch spring 44. Finally, a manually adjustable screw 112 is carried by the outer end of the switch spring 44 and cooperates with the outer end of the bimetallic element 43 in order to serve the contact purpose and to render adjustable the effective temperature range of the thermostatic switch 42.

In view of the foregoing, it will be understood that in the event of operation of the range 11 under no-load operating conditions, that the isolator 41 protects the magnetron 31, as previously explained, and the heat generated in the isolator 41 is removed therefrom by operation of the fan 90; however, as time proceeds, the temperature of the isolator 41 is elevated and after a predetermined time interval the temperature of the thermostatic switch 42 is rendered adequate to effect operation thereof into its open position, thereby to effect the restoration of the relay 85 for the purpose of effecting arresting of the oscillator 30 in the manner previously explained. Subsequently, the continued operation of the fan 90 effects cooling of the isolator 41 so that the thermostatic switch 42 is returned into its closed position so as to bring about reoperation of the relay 85 and the consequent reoperation of the oscillator 30. As previously noted, the temperature range of control of the thermostatic switch 42 may be suitably adjusted by manipulation of the manually operable screw 112.

Referring now to Figs. 1 and 3, a modified form of the wave guide arrangement is contemplated that includes a different form of the isolater 341 that is arranged between the inner section 40a and the outer section 40b of the wave guide 40; which isolater 341 is of the fundamental construction of that disclosed in U.S. Patent No. 2,644,930 that was granted on July 7, 1953, to Charles H. Luhrs and William J. Tull. More particularly, the isolator 341 comprises a tubular construction, including an intermediate section 342 of substantially circular configuration, an inner section 343 of substantially rectangular configuration and on outer section 344 of substantially rectangular configuration; the extreme inner end of the inner section 343 being provided with a flanged connector 344 that is secured to the flanged connector carried by the outer end of the inner section 40a of the wave guide 40, and the extreme outer end of the outer section 344 being provided with a flanged connector 346 that is secured to the flanged connector carried by the inner end of the outer section 40b of the wave guide 40. Of course, the tubular structure also includes a transition section 347 disposed between the intermediate and inner sections 342 and 343 and a transition section 348 disposed between the intermediate and outer sections 342 and 344. As illustrated, the long faces of the rectangular inner section 343 are arranged in a horizontal plane, while the long faces of the rectangular outer section 344 are arranged in a plane disposed at an angle of about 45° with respect to the horizontal; whereby there is the angular shift of about 45° between the axes of the inner and outer sections 343 and 344.

Also, a side arm 350 is carried by the intermediate section 342, which side arm is of substantially rectangular configuration and arranged substantially in a vertical upstanding position, the lower end of the side arm 351 being connected to the tubular intermediate section 342 adjacent to the transition section 347 and spaced therefrom a distance substantially $$\frac{NL}{4}$$

where N is any odd integer including 1, and L is a wave length of the microwave energy in the wave guide 40. The upper end of the side arm 350 is closed by a cap 351, as best shown in Fig. 7; and in the upper end of the cap 351, there is arranged a body 352 of powdered iron or other "lossy" material disposed in good heat exchange relation with the end wall 351a of the cap 351. Also, the end wall 351a carries thermostatic switch 353 arranged in good heat exchange relation therewith; which thermostatic switch 353 may essentially comprise a bimetallic element 354 and a switch spring 355. The inner end of the bimetallic element 354 is mounted upon the end wall 351a by a suitable block of heat-conducting material 356, and the inner end of the switch spring 355 is mounted upon the inner end of the bimetallic element 354 by a suitable block of insulating material 357. The outer end of the switch spring 355 carries a manually adjustable screw 358 that cooperates with the outer end of the bimetallic element 354 and serves as an electrical contact therebetween; whereby the screw 358 is adjustable in order to set the control temperature of the thermostatic switch 353. In this arrangement, the bimetallic element 354 is connected to the conductor 92 extending to the winding of the relay 85 and the switch spring 355 is connected to the conductor 93 extending to the door switch 94.

Further considering the construction of the isolator 341 and referring to Figs. 3, 4, 5 and 6, a pair of longitudinally spaced-apart pole pieces 361 are carried by the exterior surface of the tubular section 342 and disposed between the side arm 350 and the transition section 348; and a pair of permanent magnets 362 are arranged in cooperating relation with the pole pieces 361. Specifically, the N poles of the permanent magnets 362 may cooperate with the right-hand pole pieces 361 and the S poles of the permanent magnets 362 may cooperate with the left-hand pole piece 361. Arranged within the tubular section 342 and disposed substantially intermediate the pole pieces 361 is a disc 363 formed of ferrite, which disc 363 carries a pair of matching pieces 364 disposed on opposite sides thereof.

Considering now the general mode of operation of the isolator 341, it will be understood that when the direct microwave energy proceeding from the magnetron 31 passes through the ferrite disc 363 arranged in the magnetic field, the polarization thereof is rotated so as to match the angular position of the outer section 344, whereby there is substantially no attenuation thereof so that the electromagnetic energy proceeds into the oven cavity 41 to effect heating of the load disposed therein, in the manner previously explained. Of course, in the event there is no-load or only a light-load in the oven cavity 14, a substantial proportion of the microwave energy is reflected therefrom back through the section 40b of the wave guide and thus through the isolator 341, whereby the polarization of the microwave energy is rotated so as to mismatch the angular position of the inner section 343 and to match the angular position of the side arm 350; whereby the reflected microwave energy is diverted substantially from the intermediate section 342 into the side arm 350 and from the inner section 343. Of course, the diversion of the reflected microwave energy from the inner section 343 protects the magnetron 31, in the manner previously explained; while the diversion of the reflected microwave energy into the side arm 350 brings about the absorption thereof by the dissipative load 352 with the consequent loading of the magnetron 31 and the heating of the dissipative load 352. Of course, the dissipative load 352 is arranged in heat exchange relation with the thermostatic switch 353; whereby the continued mismatch of the magnetron 31 by no-load or a light-load in the oven cavity 14 throughout a predetermined time interval will effect operation of the thermostatic switch 353 into its open position causing restoration of the relay 85 to arrest operation of the oscillator 30, in the manner previously explained.

Moreover, it will be understood that the fan 90 may be arranged in operative relation with respect to the cap 351 and the thermostatic switch 353 so as to effect cooling thereof in the manner described in conjunction with the isolator 41 of Figs. 1 and 2.

In view of the foregoing, it is apparent that there has been provided in an electronic cooking appliance, an improved arrangement for protecting the magnetron against reflected microwave energy from the oven cavity in the event of a substantial load mismatch therebetween, as well as an improved circuit arrangement for selectively controlling the operation of the magnetron in the event the load mismatch is of prolonged time duration.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a cooking appliance, metal wall structure defining a substantially closed cooking cavity, a generator operative to produce microwave energy, a single wave guide interconnecting said cavity and said generator, an isolator disposed in said wave guide and occupying a series position between said generator and said cavity, said isolator being arranged to effect relatively low attenuation of direct microwave energy passing therethrough in the direction from said generator to said cavity and to effect relatively high attenuation of reflected microwave energy passing therethrough in the direction from said cavity to said generator, a circuit for controlling the operation of said generator, and means controlled by said isolator for governing said circuit.

2. In a cooking appliance, metal wall structure defining a substantially closed cooking cavity, a generator operative to produce microwave energy, a single wave guide interconnecting said cavity and said generator, means for selectively controlling the operation of said generator, an isolator disposed in said wave guide and occupying a series position between said generator and said cavity, said isolator being arranged to effect relatively low attenuation of direct microwave energy passing therethrough in the direction from said generator to said cavity and to effect relatively high attenuation of reflected microwave energy passing therethrough in the direction from said cavity to said generator, and additional means governed by the amount of microwave energy attenuated by said isolator for selectively controlling the operation of said generator.

3. In a cooking appliance, metal wall structure defining a substantially closed cooking cavity, a generator operative to produce microwave energy, a single wave guide interconnecting said cavity and said generator, means for selectively controlling the operation of said generator, an isolator disposed in said wave guide and occupying a series position between said generator and said cavity, said isolator being arranged to effect relatively low attenuation of direct microwave energy passing therethrough in the direction from said generator to said cavity and to effect relatively high attenuation of reflected microwave energy passing therethrough in the direction from said cavity to said generator, and additional means responsive to the temperature of said isolator for selectively controlling the operation of said generator.

4. In a cooking appliance, metal wall structure defining a substantially closed cooking cavity, a generator operative to produce microwave energy, a single wave guide interconnecting said cavity and said generator, means for selectively controlling the operation of said generator, an isolator disposed in said wave guide and occupying a series position between said generator and said cavity, said isolator being arranged to effect relatively low attenuation of direct microwave energy passing therethrough in the direction from said generator to said cavity and to effect relatively high attenuation of reflected microwave energy passing therethrough in the direction from said cavity to said generator, a thermostat operatively associated with said isolator and governed by the temperature thereof, and additional means governed by said thermostat for selectively controlling the operation of said generator.

5. In a cooking appliance, metal wall structure defining a substantially closed cooking cavity, a generator operative to produce microwave energy, a single wave guide interconnecting said cavity and said generator, means for selectively controlling the operation of said generator, an isolator disposed in said wave guide and occupying a series position between said generator and said cavity, said isolator including a side arm, said isolator being responsive to direct microwave energy from said generator to pass the same to said cavity and responsive to reflected microwave energy from said cavity to divert the same into said side arm, a load element disposed in said side arm and arranged to dissipate the reflected microwave energy diverted thereinto, and additional means governed by the amount of reflected microwave energy dissipated by said load element for selectively controlling the operation of said generator.

6. In a cooking appliance, metal structure defining a substantially closed cooking cavity, a generator operative to produce microwave energy, a single wave guide interconnecting said cavity and said generator, means for selectively controlling the operation of said generator, an isolator disposed in said wave guide and occupying a series position between said generator and said cavity, said isolator including a side arm, said isolator being responsive to direct microwave energy from said generator to pass the same to said cavity and responsive to reflected microwave energy from said cavity to divert the same into said side arm, a load element disposed in said side arm and arranged to dissipate the reflected microwave energy diverted thereinto, a thermostat operatively associated with said loaded element and governed by the temperature thereof, and additional means governed by said thermostat for selectively controlling the operation of said generator.

References Cited in the file of this patent

UNITED STATES PATENTS

| | | |
|---|---|---|
| 2,595,748 | Andrews | May 6, 1952 |
| 2,644,930 | Luhrs et al. | July 7, 1953 |
| 2,648,772 | Dawson et al. | Aug. 11, 1953 |
| 2,704,802 | Blass et al. | Mar. 22, 1955 |
| 2,776,412 | Sparling | Jan. 1, 1957 |
| 2,790,054 | Haagensen | Apr. 23, 1957 |

UNITED STATES PATENT OFFICE

CERTIFICATE OF CORRECTION

Patent No. 2,929,905 March 22, 1960

Donald E. Hahn

It is hereby certified that error appears in the printed specification of the above numbered patent requiring correction and that the said Letters Patent should read as corrected below.

Column 10, line 47, for "loaded" read -- load --.

Signed and sealed this 20th day of September 1960.

(SEAL)
Attest:

KARL H. AXLINE
Attesting Officer

ROBERT C. WATSON
Commissioner of Patents